(No Model.)
P. J. HARRAH.
SHAFT HOLDER FOR VEHICLES.
No. 412,086. Patented Oct. 1, 1889.
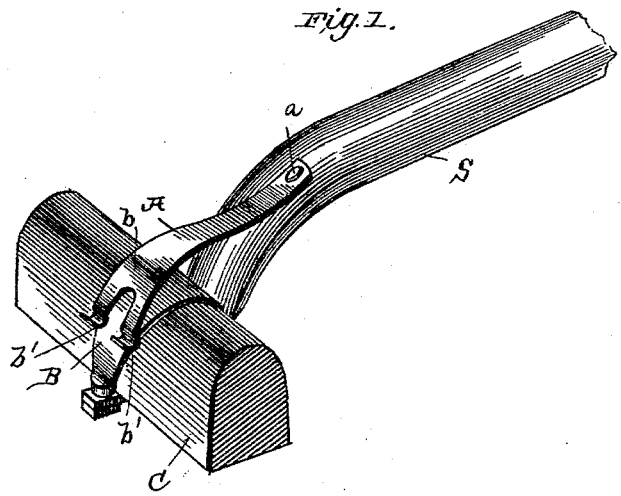
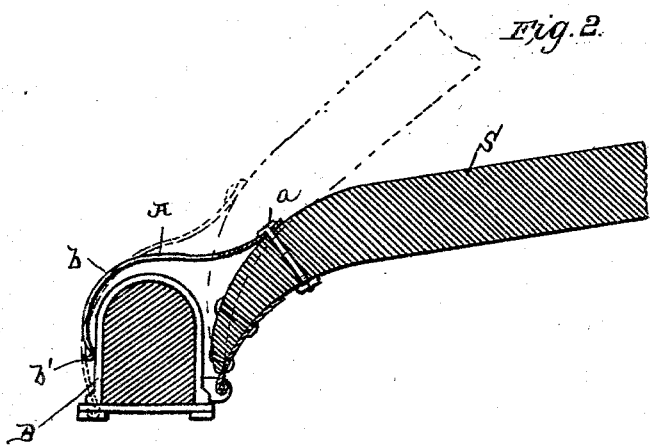
Witnesses,
Wm. S. Hodges
Thos. King
Inventor,
Philip J. Harrah
By his Attorney

UNITED STATES PATENT OFFICE.

PHILIP J. HARRAH, OF BLOOMFIELD, INDIANA, ASSIGNOR OF ONE-THIRD TO S. LEHMAN, OF SAME PLACE.

SHAFT-HOLDER FOR VEHICLES.

SPECIFICATION forming part of Letters Patent No. 412,086, dated October 1, 1889.

Application filed August 15, 1889. Serial No. 320,861. (No model.)

*To all whom it may concern:*

Be it known that I, PHILIP J. HARRAH, a citizen of the United States of America, residing at Bloomfield, in the county of Greene and State of Indiana, have invented certain new and useful Improvements in Shaft-Holders and Anti-Rattlers, of which the following is a specification, reference being had therein to the accompanying drawings.

This invention pertains to certain new and useful improvements in shaft-holders, having for its object the production of extremely simple and highly-efficient means for holding a shaft or tongue elevated when not in use or aiding in retaining the same on a horizontal plane while in use, whereby the rattling of the coupling is prevented and a free and easy movement is secured.

The invention consists in a spring-arm rigidly secured at one end to a vehicle tongue or shaft and having its other widened end constantly in engagement with the thill-clip attached to the vehicle-axle, said latter end of the spring-arm being forked, so as to permit it to readily slide or pass by the nut securing the ordinary yoke and clip, and by curving said end shoulders formed thereby engage the axle and insure the holding of the shaft or tongue elevated, substantially as hereinafter fully set forth, and particularly pointed out in the claims.

In the accompanying drawings, Figure 1 is a view in perspective showing my invention as applied to a shaft. Fig. 2 is a vertical sectional view thereof.

Heretofore various devices have been employed for holding a shaft or tongue elevated, and likewise means have been adopted to prevent rattling of the thills; but to combine in one device both of these elements is the object of my invention, and also to aid in holding the shafts or a tongue on an approximately horizontal plane when attached to a horse's harness.

Referring to the drawings, A designates a slightly bent or curved spring-arm, which at its forward end is secured to a shaft S by means of a nutted bolt or clip $a$, the latter being applied just below the curvature of the shaft, as the latter is now made. The outer end of this spring-arm is widened and forked, as shown at $b$, the latter being constantly in contact with the axle-clip B, to which the thill of shaft S is coupled. The extreme ends of these forks are bent, forming opposite shoulders $b'$ $b'$, which, when the shaft is elevated to its utmost limit, engage the under side of the axle and firmly hold the shaft in a vertical position. The forked end of the spring-arm prevents contact with the ordinary nut and yoke of the clip, the forks passing on either side thereof. The widened end of the spring-arm is always in contact with the rear side of yoke C, upon which it firmly bears. This aids in holding the shaft horizontal when in use, and also serves as an anti-rattler, preventing the rattling of the thill and its coupling. It will also be observed that the pull on the spring-arm is longitudinal of the length thereof, and that as but very little bend or curvature is required in the said arm to secure the desired result the same occupies but a minimum amount of space, and is both strong and durable.

My invention is so very simple that there is little or no danger of its getting out of order or becoming loose. The same is also extremely cheap and durable.

I claim as my invention—

1. The combination, with the thill-coupling having the axle-clip and the shaft or tongue, of the spring-arm herein described, rigidly secured at its forward end to said shaft or tongue and having its rear widened curved end continuously in contact with and bearing against the rear side of said clip, substantially as set forth.

2. The herein-described improved shaft or tongue holder and anti-rattler, consisting of the combination, with an axle-clip and a shaft or tongue having an inner curved end, of a spring-arm rigidly secured at its forward end to said curved end of the shaft or tongue and having a rearwardly-inclined curved widened portion provided with two forks constantly in contact with the rear side of said clip, and having end shoulders formed therewith, which, when the shaft or tongue is elevated, engage the under side of the axle, substantially as set forth.

In testimony whereof I affix my signature in presence of two witnesses.

PHILIP J. HARRAH.

Witnesses:
OTTO F. HEROLD,
MARION J. TIMMONS.